United States Patent
Liang et al.

(10) Patent No.: US 11,152,624 B2
(45) Date of Patent: Oct. 19, 2021

(54) POSITIVE ELECTRODE CURRENT COLLECTOR, POSITIVE ELECTRODE PIECE, ELECTROCHEMICAL DEVICE AND APPARATUS

(71) Applicant: Contemporary Amperex Technology Co., Limited, Ningde (CN)

(72) Inventors: Chengdu Liang, Ningde (CN); Qisen Huang, Ningde (CN); Shiwen Wang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/132,173

(22) Filed: Dec. 23, 2020

(65) Prior Publication Data

US 2021/0111412 A1    Apr. 15, 2021

Related U.S. Application Data

(63) Continuation of application No. PCT/CN2019/129349, filed on Dec. 27, 2019.

(30) Foreign Application Priority Data

Jul. 1, 2019  (CN) .................. 201910586679.X

(51) Int. Cl.
| | |
|---|---|
| *H01M 4/66* | (2006.01) |
| *H01M 4/70* | (2006.01) |
| *H01M 4/02* | (2006.01) |

(52) U.S. Cl.
CPC ........... *H01M 4/667* (2013.01); *H01M 4/661* (2013.01); *H01M 4/662* (2013.01); *H01M 4/664* (2013.01);

(Continued)

(58) Field of Classification Search
None
See application file for complete search history.

(56) References Cited

U.S. PATENT DOCUMENTS

| | | | | |
|---|---|---|---|---|
| 6,280,873 | B1* | 8/2001 | Tsukamoto | ....... H01M 10/0431 429/94 |
| 8,445,139 | B2* | 5/2013 | Hosaka | ................... H01M 4/13 429/245 |
| 2012/0189912 | A1* | 7/2012 | Honda | .................. H01M 4/666 429/211 |

FOREIGN PATENT DOCUMENTS

| | | |
|---|---|---|
| CN | 106898729 A | 6/2017 |
| CN | 108281662 A | 7/2018 |

(Continued)

OTHER PUBLICATIONS https://www.molex.com/mx_upload/superfamily/polymicro/pdfs/polyimide_physical_properties.pdf. "Polyimide Characteristics" (one page). No date (Year: 0000).*

(Continued)

*Primary Examiner* — Tracy M Dove
(74) *Attorney, Agent, or Firm* — Maier & Maier, PLLC

(57) ABSTRACT

A positive electrode current collector, a positive electrode piece, an electrochemical device and an apparatus, where the positive electrode current collector includes a support layer and a conductive layer provided on the support layer, where a material of the conductive layer is aluminum or aluminum alloy, and a thickness $D_1$ of the conductive layer is 300 nm≤$D_1$≤2 μm; an elongation at break B of the support layer is 10,000%≥B≥12%, and a volume resistivity of the support layer is greater than or equal to $1.0 \times 10^{-5}$ Ω·m; when a tensile strain of the positive electrode current collector is 2%, a square resistance growth rate $T_1$ of the conductive layer is $T_1$≤10%. The positive electrode current collector provided in the present application can simultaneously take into (Continued)

account both high safety performance and electrical performance.

15 Claims, 5 Drawing Sheets

(52) U.S. Cl.
CPC ...... *H01M 4/668* (2013.01); *H01M 2004/021* (2013.01); *H01M 2004/028* (2013.01)

(56) References Cited

FOREIGN PATENT DOCUMENTS

| | | |
|---|---|---|
| CN | 108963266 A | 12/2018 |
| CN | 109873164 A | 6/2019 |
| WO | 2019/103465 A1 | 5/2019 |

OTHER PUBLICATIONS

International Search Report dated Mar. 26, 2020 in corresponding International application No. PCT/CN2019/129349; 5 pages.
Written Opinion of the International Searching Authority dated Mar. 26, 2020 in corresponding International application No. PCT/CN2019/129349; 10 pages.

\* cited by examiner

POSITIVE ELECTRODE CURRENT COLLECTOR, POSITIVE ELECTRODE PIECE, ELECTROCHEMICAL DEVICE AND APPARATUS

CROSS-REFERENCE TO RELATED APPLICATIONS

This application is a continuation of International Application No. PCT/CN2019/129349, filed on Dec. 27, 2019, which claims priority to Chinese Patent Application No. 201910586679.X, filed on Jul. 1, 2019, both of which are hereby incorporated by reference in their entireties.

TECHNICAL FIELD

The present application belongs to the technical field of electrochemical devices, and in particular, to a positive electrode current collector, a positive electrode piece, an electrochemical device and an apparatus.

BACKGROUND

Lithium-ion secondary batteries are widely used in electric vehicles and consumer electronic products due to their advantages of, for example, high energy density, high output power, long cycle life and low environmental pollution. However, when the lithium-ion secondary batteries are subjected to an abnormal condition such as nail piercing, it is easy to cause an internal short circuit of the batteries. At this time, the batteries produce a large current and are accompanied by a large number of short-circuit heat generation, which is easy to cause the batteries to smoke, fire, and even explode, having a big safety risk.

In the prior art, an diaphragm with a high puncture resistance is used to avoid the internal short circuit of the batteries, or selecting electrolytes and active materials with high thermal stability, providing heat dissipation devices and other means are used to reduce the harmfulness of the internal short circuit of the batteries. However, the existing technology cannot effectively control the internal short circuit of the batteries and short-circuit heat generation, and the safety of the batteries cannot meet the higher and higher requirements in the market.

Based on this, the present application is proposed.

SUMMARY

Embodiments of the present application provide a positive electrode current collector, a positive electrode piece, an electrochemical device and an apparatus, aiming at enabling the positive electrode current collector to have high nail piercing safety performance and good electrical performance, so that the electrochemical device and the apparatus have high safety performance and good electrochemical performance.

A first aspect of the embodiments of the present application provides a positive electrode current collector, including a support layer having two opposite surfaces in a direction of its own thickness; a conductive layer provided on at least one of the two surfaces of the support layer; where a material of the conductive layer is aluminum or aluminum alloy, and a thickness $D_1$ of the conductive layer is 300 nm≤$D_1$≤2 µm, preferably 500 nm≤$D_1$≤2 µm, and more preferably 600 nm≤$D_1$≤1.5 µm; an elongation at break B of the support layer satisfies 1,0000%≥B≥12%, further preferably 400%≥B≥15%, and more preferably 400%≥B≥30%; a volume resistivity of the support layer is greater than or equal to $1.0×10^{-5}$ Ω·m; when a tensile strain of the positive electrode current collector is 2%, a square resistance growth rate $T_1$ of the conductive layer is $T_1$≤10%, preferably $T_1$≤5%, preferably $T_1$≤2%, and more preferably $T_1$≤1%.

A second aspect of the embodiments of the present application provides a positive electrode piece, including a positive electrode current collector and a positive electrode active material layer arranged on the positive electrode current collector, where the positive electrode current collector is the positive electrode current collector according to the first aspect of the embodiments of the present application.

A third aspect of the embodiments of the present application provides an electrochemical device, including a positive electrode piece, a negative electrode piece, a diaphragm and an electrolyte, where the positive electrode piece is the positive electrode piece according to the second aspect of the embodiments of the present application.

A fourth aspect of the embodiments of the present application provides an apparatus, including the electrochemical device of the third aspect of the embodiments of the present application.

In the positive electrode current collector provided by the embodiments of the present application, the conductive layer (aluminum layer or aluminum alloy layer) with a small thickness is arranged on at least one surface of the support layer, which is beneficial to reduce the weight of the current collector and improve the weight energy density of the electrochemical device, compared with a traditional metal positive electrode current collector (such as aluminum foil).

Secondly, the thickness of the conductive layer is small, the elongation at break of the support layer is 12% to 1,0000%, and the volume resistivity of the support layer is greater than or equal to $1.0×10^{-5}$ Ω·m, so when an abnormal condition such as nail piercing occurs in the electrochemical device, not only burrs produced by the conductive layer are greatly reduced compared with the traditional metal current collector, but also the burrs produced by the support layer with high volume resistivity can wrap the metal burrs produced by the conductive layer. As a result, the electrochemical device has a large short-circuit resistance when the internal short-circuit occurs, reducing the short-circuit current and the short-circuit heat generation. In addition, when the nail piercing occurs, a local conductive network is cut off, which can prevent the internal short circuit of the electrochemical device in a large area or even the whole electrochemical device. In this way, the damage to the electrochemical device caused by the nail piercing and the like can be limited to a piercing site, only forming a "point break", without affecting a normal operation of the electrochemical device in a certain period of time. Therefore, by using the positive electrode current collector of the embodiments of the present application, the electrochemical device has high nail piercing safety performance.

In addition, when the tensile strain of the positive electrode current collector is 2%, the square resistance growth rate of the conductive layer is 10% or less. In the process of electrode piece processing and battery expansion, the resistance of the conductive layer caused by tensile deformation can be prevented from increasing rapidly, to ensure that the positive electrode current collector has good conductivity and current collection performance, so that the electrochemical device has low impedance and small polarization, thereby making the electrochemical device has high electrochemical performance.

The apparatus of the present application includes the electrochemical device described in the third aspect of the present application, and thus has at least the same advantages as the electrochemical device.

Further, when the tensile strain of the positive electrode current collector is greater than or equal to 4%, the square resistance growth rate of the conductive layer is 50% or more, which can better ensure that the electrochemical device according to the present application has good nail piercing safety performance.

Further, a density of the conductive layer is 2.5 g/cm$^3$-2.8 g/cm$^3$, which can better ensure the good conductivity and current collection performance of the positive electrode current collector and improve the electrochemical performance of the electrochemical device.

BRIEF DESCRIPTION OF DRAWINGS

In order to more clearly illustrate the technical solution of the embodiments of the present application, the drawings used in the embodiments of the present application will be briefly introduced below. For those of ordinary skill in the field, other drawings can also be obtained according to these drawings without creative work.

DETAILED DESCRIPTION

In order to make the purpose, technical solution and beneficial technical effect of the present application more clear, the present application will be further explained in detail in combination with the embodiments below. It should be understood that the embodiments described in the specification are intended only to interpret the present application, but not to limit the present application.

For simplicity, only some numerical ranges are explicitly disclosed herein. However, any lower limit can be combined with any upper limit to form an unspecified range; and any lower limit can be combined with other lower limit to form an unspecified range. Similarly, any upper limit can be combined with any other upper limit to form an unspecified range. In addition, although not explicitly recorded, each point or single value between endpoints of a range is included in the range. Thus, each point or single value can be used as its own lower or upper limit to be combined with any other point or single value or with other lower or upper limit to form an unspecified range.

In the description herein, it should be noted, unless otherwise specified, "above" and "below" are including the number itself, and "more" in "one or more" means two or more.

The above contents of the present application are not intended to describe every disclosed embodiment or every implementation in the present application. The following description more specifically exemplifies exemplary embodiments. In many places throughout the application, guidance is provided by a series of embodiments, these embodiments can be used in various combinations. In each embodiment, enumeration is only regarded as a representative group and should not be interpreted as exhaustive.

Positive Electrode Current Collector

Figure 1:
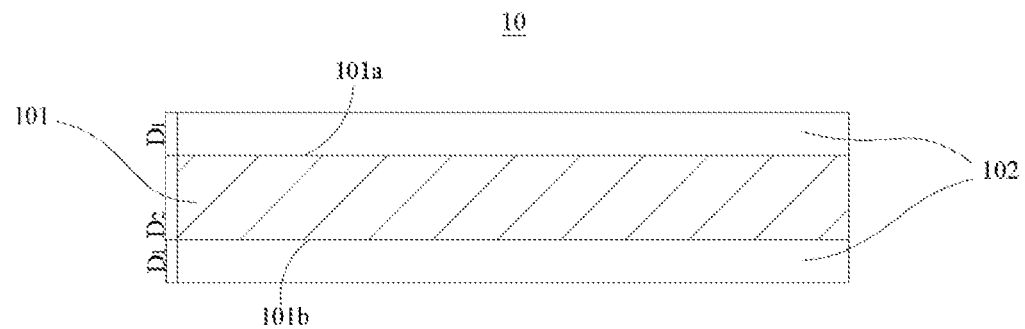
FIG. 1 shows a schematic structural diagram of a positive electrode current collector provided by an embodiment of the present application.
Figure 2:
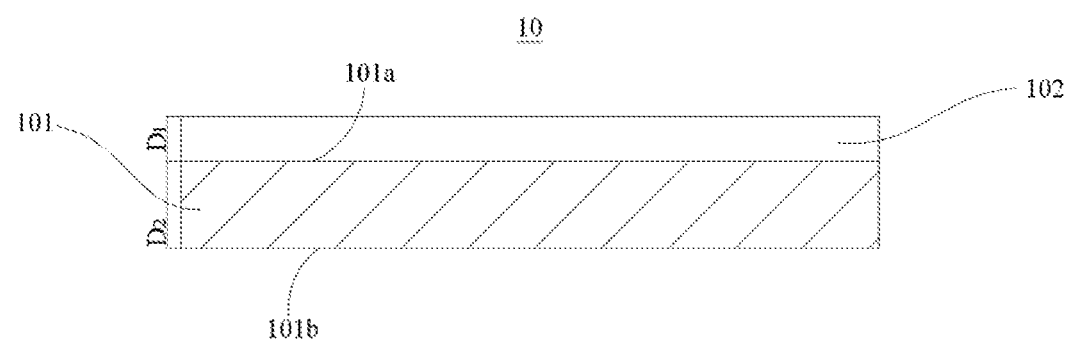
FIG. 2 shows a schematic structural diagram of a positive electrode current collector provided by another embodiment of the present application.

A first aspect of embodiments of the present application provides a positive electrode current collector 10. Referring to FIGS. 1 and 2, the positive electrode current collector 10 includes a support layer 101 and a conductive layer 102 which are laminated. The support layer 101 has a first surface 101a and a second surface 101b opposite to each other in its own thickness direction, and the conductive layer 102 is disposed on either or both of the first surface 101a and the second surface 101b of the support layer 101.

In the positive electrode current collector 10 of the embodiments of the present application, a material of the conductive layer is aluminum or aluminum alloy, a thickness $D_1$ of the conductive layer is 300 nm≤$D_1$≤2 μm, an elongation at break B of the support layer is 1,0000%≥B≥12%, a volume resistivity of the support layer is greater than or equal to 1.0×10$^{-5}$ Ω·m; and when a tensile strain of the positive electrode current collector is 2%, a square resistance growth rate $T_1$ of the conductive layer is $T_1$≤10%.

In the positive electrode current collector 10 of the embodiments of the present application, a conductive layer 102 (aluminum layer or aluminum alloy layer) with a small thickness is arranged on at least one surface of the support layer 101, which, compared with a conventional metal positive electrode current collector (such as aluminum foil), is beneficial to reduce a weight of the positive electrode current collector 10 and increase a weight energy density of the electrochemical device.

Secondly, the thickness of the conductive layer 102 is small, the elongation at break B of the support layer 101 is 1,0000%≥B≥12%, and the volume resistivity of the support layer 101 is greater than or equal to 1.0×10$^{-5}$ Ω·m, so when an abnormal condition such as nail piercing occur in the electrochemical device, not only burrs produced by the conductive layer 102 are greatly reduced compared with a traditional metal current collector, but also burrs produced by the support layer 101 with high volume resistivity can wrap the metal burrs produced by the conductive layer 102.

As a result, the electrochemical device has a large short-circuit resistance when an internal short-circuit occurs, reducing the short-circuit current and the short-circuit heat generation. In addition, when the nail piercing occurs, a local conductive network is cut off, which can prevent the internal short circuit of the electrochemical device in a large area or even the whole electrochemical device. In this way, the damage to the electrochemical device caused by the nail piercing and the like can be limited to a piercing site, only forming a "point break", without affecting a normal operation of the electrochemical device in a certain period of time. Therefore, by using the positive electrode current collector 10 of the embodiments of the present application, the electrochemical device has high nail piercing safety performance.

In addition, the positive electrode current collector 10 is sometimes stretched during the processing and use of the positive electrode piece and the electrochemical device, such as rolling or battery expansion, and when the tensile strain of the positive electrode current collector 10 is 2%, the square resistance growth rate $T_1$ of the conductive layer 102 is 10% or less, which can effectively prevent the resistance of the conductive layer 102 from increasing sharply due to tensile deformation, and ensure that the positive electrode current collector 10 has good conductivity and current collection performance, so that the electrochemical device has low impedance and small polarization, and thereby the electrochemical device has high electrochemical performance, where the electrochemical device has both high rate performance and cycle performance.

In some optional embodiments, the thickness $D_1$ of the conductive layer 102 may be 300 nm, 350 nm, 400 nm, 450 nm, 500 nm, 600 nm, 700 nm, 800 nm, 900 nm, 1 μm, 1.2 μm, 1.5 μm, 1.8 μm or 2 μm. A range of the thickness $D_1$ of the conductive layer 102 can be composed of any two values mentioned above. Preferably, $D_1$ is 500 nm≤$D_1$≤2 μm. More preferably, 600 nm≤$D_1$≤1.5 μm.

The thickness of the conductive layer 102 is 2 μm or less, preferably 1.5 μm or less, it has a significantly reduced thickness, which is beneficial to improve the nail piercing safety performance and the weight energy density of the electrochemical device. The thickness of the conductive layer 102 is 300 nm or more, preferably 500 nm or more, and more preferably 600 nm or more, which is beneficial to make the positive electrode current collector 10 have good conductivity and current collection performance, and make the conductive layer 102 not easy to be damaged during the processing and use of the positive electrode current collector 10, so that the positive electrode current collector 10 has good mechanical stability and long service life.

In some optional embodiments, the elongation at break B of the support layer 101 may be 12%, 15%, 20%, 30%, 70%, 100%, 200%, 300%, 400%, 800%, 1,000%, 3000%, 5000%, 8000% or 1,0000%. A range of the elongation at break B of the support layer 101 may be composed of any two values mentioned above. Preferably, 400%≥B≥15%. More preferably, 400%≥B≥30%.

Further, the elongation at break B of the support layer 101 is 12% or more, preferably 15% or more, and more preferably 30% or more, and when an abnormal condition such as nail piercing occurs in the electrochemical device, the burrs of the support layer 101 can effectively wrap the burrs of the conductive layer 102, improving the nail piercing safety performance of the electrochemical device. Especially, at this time, the ductility of the support layer 101 is significantly greater than that of the conductive layer 102, and then the conductive layer 102 can be forced to stretch when an abnormal condition such as nail piercing occurs in the electrochemical device, so that the local conductive network can be better cut off. As a result, the damage to the electrochemical device caused by nail piercing and the like is better limited to the piercing site, only forming a "point break", without affecting the normal operation of the electrochemical device in a certain period of time.

The elongation at break B of the support layer 101 is 1,0000% or less, preferably 400% or less, which is beneficial to make the support layer 101 have a good support and protection effect on the conductive layer 102 and ensure the overall strength of the positive electrode current collector 10.

In some optional embodiments, when the tensile strain of the positive electrode current collector 10 is 2%, the square resistance growth rate $T_1$ of the conductive layer 102 may be 10%, 9%, 8%, 7%, 6%, 5%, 4%, 3%, 2%, 1% or 0. Preferably, $T_1$≤5%. More preferably, $T_1$≤2%. More preferably, $T_1$≤1%.

Further, when the tensile strain of the positive electrode current collector 10 is greater than or equal to 4%, the square resistance growth rate $T_2$ of the conductive layer 102 is preferably $T_2$≥50%, which can further improve the nail piercing safety performance of the electrochemical device.

In some optional embodiments, when the tensile strain of the positive electrode current collector 10 is greater than or equal to 4%, the square resistance growth rate $T_2$ of the conductive layer 102 may be 50%, 60%, 70%, 80%, 90%, 100%, 120%, 150%, 200%, 300%, 400%, 500% or 700%. Preferably, $T_2$≥100%. More preferably, $T_2$≥150%.

In the positive electrode current collector 10 of the embodiments of the present application, the thickness $D_2$ of the support layer 101 is preferably 1 μm≤$D_2$≤20 μm, such as 1 μm, 1.5 μm, 2 μm, 3 μm, 4 μm, 5 μm, 6 μm, 7 μm, 8 μm, 10 μm, 12 μm, 15 μm, 18 μm, and 20 μm. The range of the thickness $D_2$ of the support layer 101 may be composed of any two values mentioned above. Preferably, $D_2$ is 2 μm≤$D_2$≤10 μm. More preferably, $D_2$ is 2 μm≤$D_2$≤6 μm.

The thickness $D_2$ of the support layer 101 is preferably 1 μm or more and more preferably 2 μm or more, which is beneficial to make the support layer 101 have sufficient mechanical strength, and not easy to break during the processing and use of the positive electrode current collector 10, playing a good role in support and protection of the conductive layer 102, and ensuring good mechanical stability and high service life of the positive electrode current collector 10. The thickness $D_2$ of the support layer 101 is preferably 20 μm or less, more preferably 10 μm or less, and more preferably 6 μm or less, which is beneficial to make the electrochemical device have small volume and weight and improve the energy density of the electrochemical device.

A Young's modulus E of the support layer 101 is preferably E≥1.9 GPa. The support layer 101 has appropriate rigidity, satisfying the supporting effect of the support layer 101 on the conductive layer 102, and ensuring the overall strength of the positive electrode current collector 10. In the process of processing the positive electrode current collector 10, the support layer 101 does not have excessive extension or deformation, which can prevent the support layer 101 from belt breakage, and is beneficial to improve the bonding firmness between the support layer 101 and the conductive layer 102, not easy to separate, thereby ensuring that the positive electrode current collector 10 has high mechanical stability and working stability, thus enabling the electrochemical device to have high electrochemical performance, such as long cycle life.

The Young's modulus E of the support layer 101 is preferably 4 GPa≤E≤20 GPA, which makes the support layer 101 have rigidity and meanwhile have a certain ability to bear deformation, and flexibility for winding in the process of processing and use of the positive electrode current collector 10, so as to better prevent belt breakage.

In some optional embodiments, the Young's modulus E of the support layer 101 may be 1.9 GPa, 2.2 GPa, 2.5 GPa, 4 GPa, 5 GPa, 6 GPa, 7 GPa, 8 GPa, 9 GPa, 10 GPa, 11 GPa, 12 GPa, 13 GPa, 14 GPa, 15 GPa, 16 GPa, 17 GPa, 18 GPa, 19 GPa or 20 GPa. The range of Young's modulus E of the support layer 101 can be composed of any two values mentioned above.

Preferably, the support layer 101 adopts one or more of a polymer material and a polymer-based composite material. Because the densities of the polymer material and the polymer-based composite material are smaller than the density of a metal, and thus compared with the traditional metal current collector, the weight of the positive electrode current collector 10 is obviously reduced and the weight energy density of the electrochemical device is increased.

As the above-mentioned polymer material. For example, it may be one or more of polyamide (PA), polyimide (PI), polyester, polyolefin, polyacetylene, siloxane polymer, polyether, polyalcohol, polysulfone, carbohydrate polymer, amino acid polymer, polysulfur nitride, aromatic ring polymer, aromatic heterocyclic polymer, epoxy resin, phenolic resin, their derivatives, their cross-linked products and their copolymers.

Further, the polymer material is one or more of such as polycaprolactam (commonly known as nylon 6), polyhexamethylene adipamide (commonly known as nylon 66), polyparaphenylene terephthalamide (PPTA), polymetaphenylene isophthalamide (PMIA), polyethylene terephthalate (PET), polybutylene terephthalate (PBT), polyethylene naphthalate (PEN), polycarbonate (PC), polyethylene (PE), polypropylene (PP), polypropylene-ethylene (PPE), poly (vinyl alcohol) (PVA), polystyrene (PS), polyvinyl chloride (PVC), polyvinylidene fluoride (PVDF), polytetrafluoroethylene (PTEE), polystyrene sodium sulfonate (PSS), polyacetylene, polypyrrole (PPy), polyaniline (PAN), polythiophene (PT), polypyridine (PPY), silicone rubber, polyoxymethylene (POM), polyphenylene, polyphenylene oxide (PPO), polyphenylene sulfide (PPS), polyethylene glycol (PEG), acrylonitrile-butadiene-styrene copolymer (ABS), cellulose, starch, protein, their derivatives, their cross-linked products and their copolymers.

As the above-mentioned polymer-based composite material, for example, it may include the above-mentioned polymer material and an additive. The volume resistivity, elongation at break and Young's modulus of the polymer material can be adjusted by the additive. The additive may be one or more of a metal material and an inorganic non-metallic material.

The metal material additive may include, for example, one or more of aluminum, aluminum alloy, copper, copper alloy, nickel, nickel alloy, titanium, titanium alloy, iron, iron alloy, silver and silver alloy.

The inorganic non-metallic material additive is, for example, one or more of a carbon-based material, alumina, silicon dioxide, silicon nitride, silicon carbide, boron nitride, silicate and titanium oxide. For another example, it may be one or more of a glass material, a ceramic material and a ceramic composite material. Where the carbon-based material is, for example, one or more of graphite, superconducting carbon, acetylene black, carbon black, Ketjen black, carbon dot, carbon nanotube, graphene and carbon nanofiber.

In some embodiments, the above additive may also be a carbon-based material coated with a metal material, such as one or more of nickel-coated graphite powder and nickel-coated carbon fiber.

Preferably, the support layer 101 uses one or more of an insulating polymer material and an insulating polymer-based composite material. The support layer 101 has a high volume resistivity, which can better improve the safety performance of the electrochemical device.

Further preferably, the support layer 101 adopts one or more of polyethylene terephthalate (PET), polybutylene terephthalate (PBT), polyethylene naphthalate (PEN), polystyrene sodium sulfonate (PSS) and polyimide (PI).

In the positive electrode current collector 10 of the embodiments of the present application, the support layer 101 may be a single layer structure or a composite layer structure of two or more layers, such as two layers, for example, two layers, three layers, four layers, etc.

Figure 3:
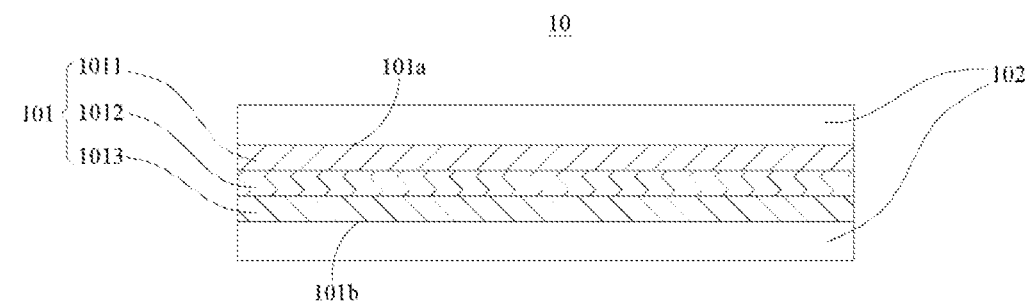
FIG. 3 shows a schematic structural diagram of a positive electrode current collector provided by another embodiment of the present application.

As an example of the support layer 101 with a composite layer structure, refer to FIG. 3, the support layer 101 is a composite layer structure formed by laminating a first sub-layer 1011, a second sub-layer 1012 and a third sub-layer 1013. The support layer 101 with the composite layer structure has opposite first and second surfaces 101a and 101b, and the conductive layer 102 is laminated on the first surface 101a and the second surface 101b of the support layer 101. Of course, the conductive layer 102 may be provided only on the first surface 101a of the support layer 101 or only on the second surface 101b of the support layer 101.

When the support layer 101 is a composite layer structure of two or more layers, the materials of the sub-layers may be the same or different.

In the positive electrode current collector 10 of the embodiments of the present application, the conductive layer 102 is made of aluminum or aluminum alloy. The weight percentage content of aluminum element in the above aluminum alloy is preferably 90 wt % or more. The above aluminum alloy can be aluminum-zirconium alloy.

The density of the conductive layer 102 is preferably 2.5 g/cm$^3$-2.8 g/cm$^3$, such as 2.5 g/cm$^3$, 2.52 g/cm$^3$, 2.55 g/cm$^3$, 2.57 g/cm$^3$, 2.6 g/cm$^3$, 2.63 g/cm$^3$, 2.65 g/cm$^3$, 2.67 g/cm$^3$, 2.7 g/cm$^3$, 2.75 g/cm$^3$, 2.8 g/cm$^3$, etc.

The density of the conductive layer 102 is preferably 2.5 g/cm$^3$ to 2.8 g/cm$^3$, which can better ensure good conductivity and current collection performance of the positive electrode current collector, so that the electrochemical device has low impedance and small polarization, improving the electrochemical performance of the electrochemical device.

The volume resistivity of the conductive layer 102 is preferably $2.5 \times 10^{-8}$ Ω·m–$7.8 \times 10^{-8}$ Ω·m, and more preferably $3.2 \times 10^{-8}$ Ω·m–$7.8 \times 10^{-8}$ Ω·m.

The volume resistivity of the conductive layer 102 is preferably $2.5 \times 10^{-8}$ Ω·m or more, more preferably $3.2 \times 10^{-8}$ Ω·m or more, and then under an abnormal condition such as nail piercing, the electrochemical device has a large short-circuit resistance when it is internally short-circuited, which is beneficial to make the electrochemical device have high safety performance. The volume resistivity of the conductive layer 102 is preferably $7.8 \times 10^{-8}$ Ω·m or less, which is beneficial to make the positive electrode current collector 10 have good conductivity and current collection performance, so that the electrochemical device has high electrochemical performance.

FIGS. 4 to 9 respectively schematically show a positive electrode current collector 10. referring to FIGS. 3 to 8, the positive electrode current collector 10 optionally includes a protective layer 103. Specifically, the conductive layer 102 includes two opposite surfaces in the direction of its own thickness, and the protective layer 103 is laminated on either or both of the two surfaces of the conductive layer 102 to protect the conductive layer 102, prevent the conductive layer 102 from being damaged by chemical corrosion or mechanical damage, and ensure the working stability and service life of the positive electrode current collector 10, thereby contributing to the safety performance and electrochemical performance of the electrochemical device. In addition, the protective layer 103 can also enhance the mechanical strength of the positive electrode current collector 10.

The material of the protective layer 103 may be one or more of a metal, a metal oxide and a conductive carbon.

The above metal is, for example, one or more of nickel, chromium, nickel-based alloy and copper-based alloy. The nickel-based alloy is an alloy formed by taking pure nickel as a matrix and adding one or several other elements, preferably a nickel-chromium alloy. The nickel-chromium alloy is an alloy formed by metal nickel and metal chromium. Optionally, a weight ratio of nickel to chromium in the nickel-chromium alloy is 1:99-99:1, for example, 9:1. The copper-based alloy is an alloy formed by taking pure copper as a matrix and adding one or several other elements, preferably a nickel-copper alloy. Optionally, a weight ratio of nickel to copper in the nickel-copper alloy is 1:99-99:1, for example, 9:1.

The above metal oxide is, for example, one or more of alumina, cobalt oxide, chromium oxide and nickel oxide.

The above conductive carbon is, for example, one or more of graphite, superconducting carbon, acetylene black, carbon black, Ketjen black, carbon dot, carbon nanotube, graphene, carbon nanofiber, preferably one or more of carbon black, carbon nanotube, acetylene black and graphene.

Figure 4:
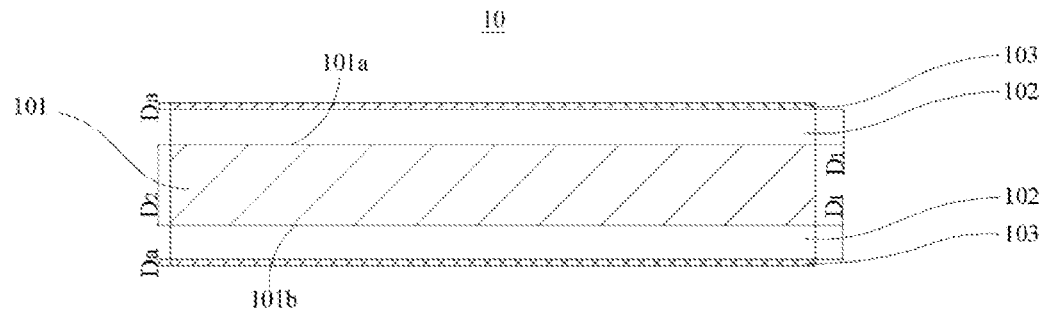
FIG. 4 shows a schematic structural diagram of a positive electrode current collector provided by another embodiment of the present application.
Figure 5:
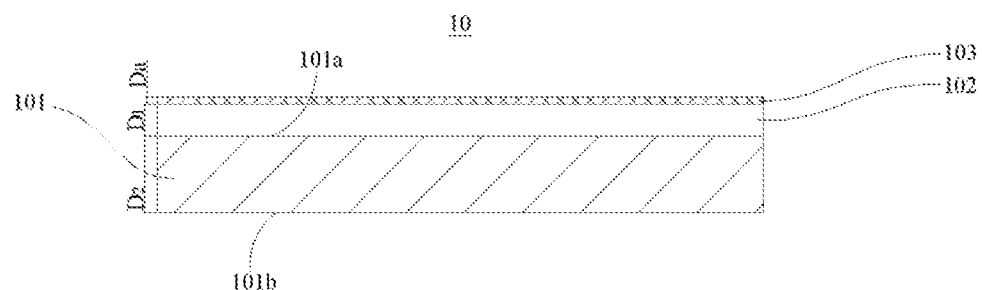
FIG. 5 shows a schematic structural diagram of a positive electrode current collector provided by another embodiment of the present application.

As some examples, referring to FIGS. 4 and 5, the positive electrode current collector 10 includes a support layer 101, a conductive layer 102, and a protective layer 103 which are laminated. Where the support layer 101 has a first surface 101a and a second surface 101b are arranged opposite to each other in a thickness direction of the support layer 101, and the conductive layer 102 is laminated on at least one of the first surface 101a and the second surface 101b of the support layer 101, the protective layer 103 is laminated on the surface of the conductive layer 102 facing away from the support layer 101.

The protective layer 103 (referred to as upper protective layer) is provided on a surface of the conductive layer 102 facing away from the supporting layer 101, can protect the conductive layer 102 from chemical corrosion and mechanical damage, and can also improve an interface between the positive electrode current collector 10 and the positive electrode active material layer, increasing the bonding force between the positive electrode current collector 10 and the positive electrode active material layer, and improving the performance of the electrochemical device.

Further, the upper protective layer is preferably a metal oxide protective layer, such as alumina, cobalt oxide, nickel oxide, chromium oxide, etc. The metal oxide protective layer has high hardness and mechanical strength, larger specific surface area and better corrosion resistance, which can better protect the conductive layer 102, enhance the bonding force between the positive electrode current collector 10 and the positive electrode active material layer, and is also beneficial to improve the overall strength of the positive electrode current collector 10; in addition, it is beneficial to improve the nail piercing safety performance of the electrochemical device.

Figure 6:
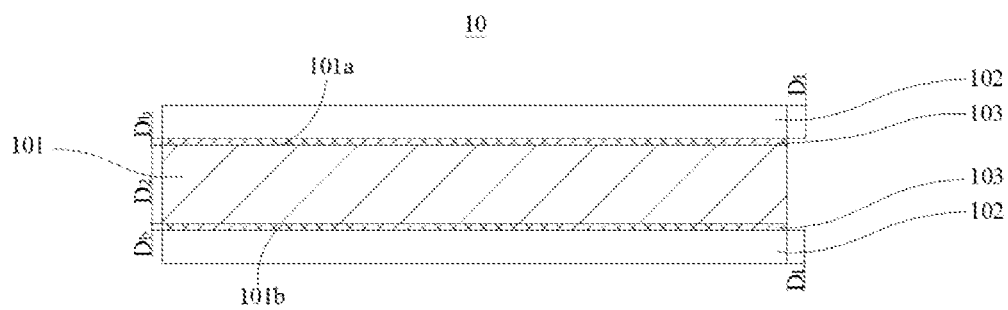
FIG. 6 shows a schematic structural diagram of a positive electrode current collector provided by another embodiment of the present application.
Figure 7:
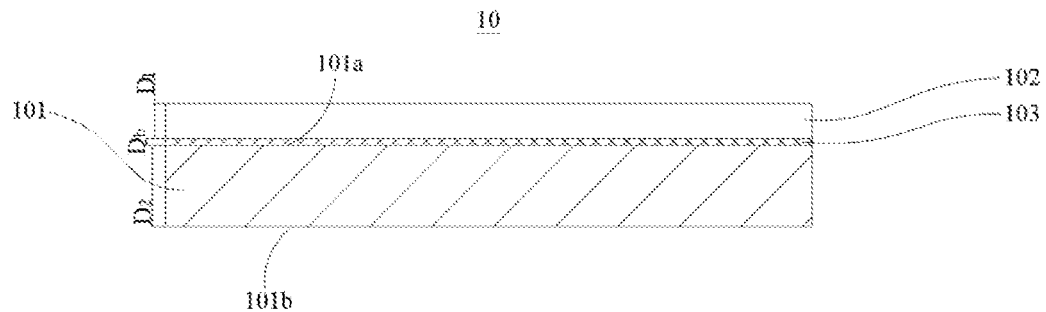
FIG. 7 shows a schematic structural diagram of a positive electrode current collector provided by another embodiment of the present application.

As other examples, referring to FIGS. 6 and 7, the positive electrode current collector 10 includes a support layer 101, a conductive layer 102, and a protective layer 103 which are laminated. Where the support layer 101 has a first surface 101a and a second surface 101b are arranged opposite to each other in a thickness direction of the support layer 101, and the conductive layer 102 is laminated on at least one of the first surface 101a and the second surface 101b of the support layer 101; the protective layer 103 is laminated on the surface of the conductive layer 102 facing the support layer 101.

A protective layer 103 (referred to as lower protective layer) is arranged on a surface of the conductive layer 102 facing the support layer 101. The lower protective layer can protect the conductive layer 102 from chemical corrosion and mechanical damage, at the same time, it can also improve the bonding force between the conductive layer 102 and the support layer 101, preventing the conductive layer 102 from separating from the support layer 101, and improving the support and protection effects of the support layer 101 on the conductive layer 102.

Further, the lower protective layer is preferably a metal oxide protective layer, such as alumina, cobalt oxide, nickel oxide, chromium oxide, etc., which could better play the above protective role and further improve the bonding force between the conductive layer 102 and the supporting layer 101, and is also beneficial to improve the overall strength of the positive electrode current collector 10.

Figure 8:
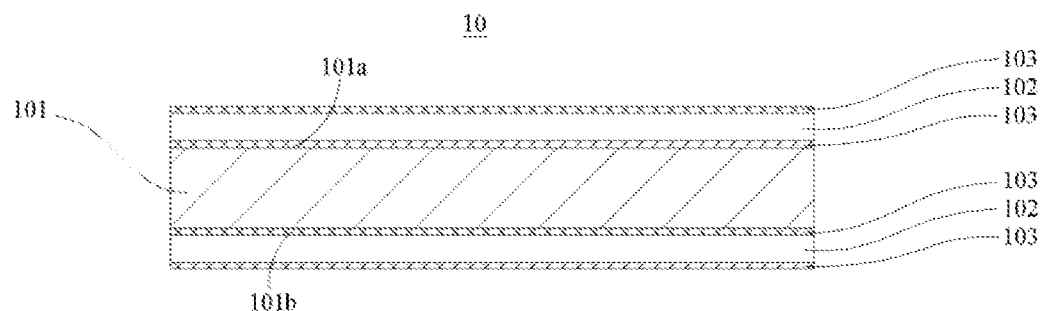
FIG. 8 shows a schematic structural diagram of a positive electrode current collector provided by another embodiment of the present application.
Figure 9:
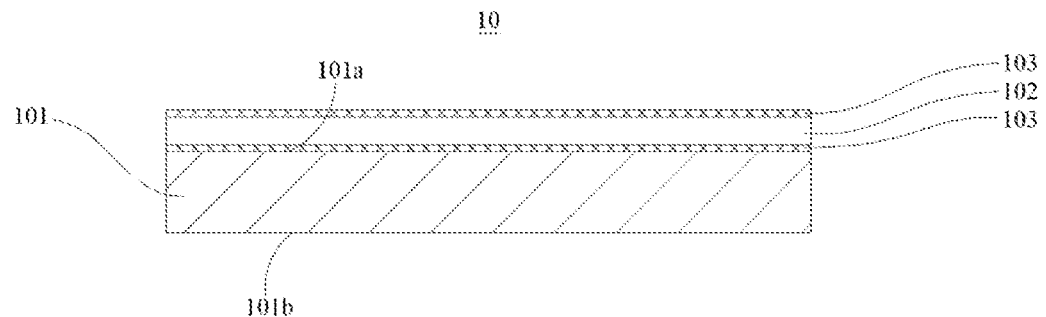
FIG. 9 shows a schematic structural diagram of a positive electrode current collector provided by another embodiment of the present application.

As further examples, referring to FIGS. 8 and 9, the positive electrode current collector 10 includes a support layer 101, a conductive layer 102, and a protective layer 103 which are laminated. Where the support layer 101 has a first surface 101a and a second surface 101b are arranged opposite to each other in the thickness direction of the support layer 101, and the conductive layer 102 is laminated on at least one of the first surface 101a and the second surface 101b of the support layer 101; the protective layer 103 is laminated on the surfaces of the conductive layer 102 facing away from and toward the support layer 101.

The protective layer 103 is provided on both surfaces of the conductive layer 102, that is, an upper protective layer and a lower protective layer are respectively provided on two surfaces of the conductive layer 102, so as to more fully protect the conductive layer 102. Further, both the upper protective layer and the lower protective layer are a metal oxide protective layer.

It is understandable that the protective layer 103 on two surfaces of the conductive layer 102 may have the same or different materials and the same or different thicknesses.

Preferably, a thickness $D_3$ of the protective layer 103 is 1 nm≤$D_3$≤200 nm and $D_3$≤0.1$D_1$. In the above range, the thickness $D_3$ of the protective layer 103 can effectively protect the conductive layer 102 and meanwhile make the electrochemical device have a high energy density.

In some optional embodiments, the thickness $D_3$ of the protective layer 103 may be 200 nm, 180 nm, 150 nm, 120 nm, 100 nm, 80 nm, 60 nm, 55 nm, 50 nm, 45 nm, 40 nm, 30 nm, 20 nm, 18 nm, 15 nm, 12 nm, 10 nm, 8 nm, 5 nm, 2 nm, 1 nm, etc., and the range of the thickness $D_3$ of the protective layer 103 may be composed of any two values described above. Preferably, 5 nm≤$D_3$≤200 nm. More preferably, 10 nm≤$D_3$≤200 nm.

Further, when the protective layers 103 are provided on both surfaces of the conductive layer 102, a thickness $D_a$ of the upper protective layer is 1 nm≤$D_a$≤200 nm and $D_a$≤0.1$D_1$, and a thickness $D_b$ of the lower protective layer is 1 nm≤$D_b$≤200 nm and $D_b$≤0.1$D_1$. Preferably, $D_a$ and $D_b$ therebetween satisfy $D_a$≥$D_b$, which is beneficial for the protective layer 103 to play a good protect effect on the conductive layer 102 and meanwhile to make the electrochemical device have a high energy density. More preferably, 0.5$D_a$≤$D_b$≤0.8$D_a$.

The conductive layer 102 may be formed on the supporting layer 101 by at least one of mechanical rolling, bonding, vapor deposition, electroless plating, and electroplating, where the vapor deposition or the electroplating is preferred, that is, the conductive layer 102 is a vapor phase deposition layer or an electroplating layer, which can improve the binding force between the conductive layer 102 and the support layer 101, effectively play the supporting effect of the support layer 101 on the conductive layer 102, and also make the burrs of the support layer 101 better wrap the burrs of the conductive layer 102 and improve the nail safety performance of the electrochemical device.

Preferably, the bonding force F between the support layer 101 and the conductive layer 102 is F≥100 N/m, more preferably F≥400 N/m.

For example, the conductive layer 102 is formed on the support layer 101 by the vapor deposition, and by reasonably adjusting and controlling process conditions of the vapor deposition, such as deposition temperature, deposition rate, atmosphere condition of the deposition chamber, etc., when the positive electrode current collector 10 is stretched, the square resistance growth rate of the conductive layer 102 meets the requirements described above, so as to improve the safety and electrochemical performance of the positive electrode current collector 10.

The above vapor deposition is preferably physical vapor deposition (PVD). The physical vapor deposition is preferably at least one of evaporation method and sputtering method; The evaporation method is preferably at least one of vacuum evaporation, thermal evaporation and electron beam evaporation, and the sputtering method is preferably magnetron sputtering.

As an example, formation of the conductive layer 102 by the vacuum evaporation includes: placing the support layer 101 after surface cleaning treatment in a vacuum plating chamber, melting and evaporating a high purity metal wire in a metal evaporation chamber at a high temperature of 1300° C.-2000° C., making the evaporated metal pass through a cooling system in the vacuum plating chamber and finally depositing it on the support layer 101 to form the conductive layer 102.

A process of forming the conductive layer 102 by the mechanical rolling may include placing an aluminum sheet or an aluminum alloy sheet in a mechanical roll, rolling it to a predetermined thickness by applying a pressure of 20t-40t, then placing it on a surface of the support layer 101 after surface cleaning treatment, then placing both them in the mechanical roll, tightly bonding them by applying a pressure of 30t-50t.

A process of forming the conductive layer 102 by bonding may include: placing an aluminum sheet or an aluminum alloy sheet in a mechanical roll, rolling it to a predetermined thickness by applying a pressure of 20t-40t; then, coating a mixed solution of polyvinylidene fluoride (PVDF) and N-methylpyrrolidone (NMP) on the surface of the support layer 101 after the surface cleaning treatment; finally, bonding the conductive layer 102 with the predetermined thickness to the surface of the support layer 101, and drying so that both them are closely bonded.

When the positive electrode current collector 10 has the protective layer 103, the protective layer 103 may be formed on the conductive layer 102 by at least one of the vapor deposition method, in-situ formation method and the coating method. The vapor deposition method can be the vapor deposition described above. The in-situ formation method is preferably an in-situ passivation method, such as a method of forming a metal oxide passivation layer in-situ on a metal surface. The coating method preferably is at least one of roll coating, extrusion coating, scraper coating and gravure coating.

Preferably, the protective layer 103 is formed on the conductive layer 102 by at least one of the vapor deposition method and the in-situ formation method, which is conducive to a high bonding force between the conductive layer 102 and the protective layer 103, thereby better playing a protective effect of the protective layer 102 on the positive electrode current collector 10 and ensuring that the positive electrode current collector 10 has a high working performance.

In the embodiments of the present application, the square resistance growth rate $T_1$ of the conductive layer when the tensile strain of the positive electrode current collector is 2%, and the square resistance growth rate $T_2$ of the conductive layer when the tensile strain of the positive electrode current collector is greater than or equal to 4% can be tested as follows.

The tensile strain of the positive electrode current collector is set to ε, then ε=ΔL/L×100%, where ΔL is an elongation caused by stretching of the positive electrode current collector, and L is an original length of the positive electrode current collector, that is, the length before being stretched.

When the tensile strain of the positive electrode current collector is ε, the square resistance growth rate of the conductive layer is set to T, and the T value can be measured by a method known in the field. As an example, a positive electrode current collector is taken and cut into a sample of 20 mm×200 mm, and the square resistance in the central area of the sample is measured by a four-probe method, and is recorded as $R_1$, and then the central area of the sample is stretched by a high-speed rail tensile machine, and an initial position is set so that a length of the sample between clamps is 50 mm Stretch is conducted at a speed of 50 mm/min, the stretching distance is the product of the original length L (50 mm) of the sample and ε, that is, the stretching distance is ΔL. The stretched sample is taken down, the square resistance of the conductive layer between the clamps is tested and recorded as $R_2$. According to the formula T=($R_2$−$R_1$)/$R_1$×100%, the square resistance growth rate T of the conductive layer is calculated when the tensile strain of the positive electrode current collector is ε.

Where the four-probe method is used to test the square resistance of the conductive layer as follows: RTS-9 double-electric four-probe tester is used, where the test environment is: room temperature 23±2° C., 0.1 MPa and relative humidity ≤65%. During the test, a sample to be tested is subjected to a surface cleaning, and then are placed horizontally on a test table. Four probes are put down so that the probes have a good contact with the surface of the conductive layer. Then a current range of the sample is calibrated by adjusting the automatic test mode, the square resistance is measured under an appropriate current range, and 8 to 10 data points of the same sample are collected for data measurement accuracy and error analysis. Finally, an average value is recorded as a square resistance value of the conductive layer.

The elongation at break of the support layer can be measured by a method known in this field. As an example, a support layer is taken and cut into a sample of 15 mm×200 mm, and a tensile test is carried out by a high-speed rail tensile machine at normal room temperature and pressure (25° C., 0.1 MPa). An initial position is set so that a sample length between the clamps is 50 mm, a tensile speed is 50 mm/min, and an equipment displacement y (mm) is recorded when stretching to fracture. Finally, the elongation at break is calculated as B=(y/50)×100%.

The volume resistivity of the support layer is the volume resistivity at 20° C., which can be measured by a method known in the field. As an example, the test is carried out in a room with constant temperature, normal pressure and low humidity (20° C., 0.1 mMpa, RH≤20%), and a wafer support layer sample with a diameter of 20 mm is prepared (size of the sample can be adjusted according to an actual size of the test instrument). The test is carried out by a three-electrode-measuring surface resistivity method (GBT1410-2006) using an insulation resistance tester (precision 10Ω). The test method is as follows: place the wafer sample between two electrodes and apply a potential difference between the two electrodes. The current generated will be distributed in the body of the wafer sample and measured by picoammeter or electrometer, in order to avoid a measurement error caused by including the surface leakage current in the measurement. The reading is the volume resistivity in Ω·m.

The Young's modulus E of the support layer can be measured by a method known in this field. As an example, a support layer is taken and cut into a sample of 15 mm×200 mm, a thickness l (μm) of the sample is measured by a tenthousandth micrometer and under normal temperature and pressure (25° C., 0.1 MPa), a tensile test is conducted using a high-speed rail tensile machine, an initial position is set so that a length of the sample between clamps is 50 mm, tensile speed is 50 mm/min, a load Q (N) when stretching to fracture and an equipment displacement z (mm) are recorded, then stress ε(GPa)=Q/(15×l) and strain η=z/50, to draw a stress-strain curve, and take a curve in an initial linear zone, a slope of the curve is Young's modulus E.

The density of the conductive layer can be determined by a method known in the field. As an example, a positive electrode current collector with an area of 10 cm² is cut, and its mass is weighed by a balance accurate to 0.0001 g, and recorded as $m_1$, in g, and thicknesses at 20 positions are measured with a tenthousandth micrometer, and their average value is taken and recorded as $d_1$, in μm. The weighed positive electrode current collector is soaked with 1 mol/L of NaOH aqueous solution for 1 minute. The support layer is taken out when the conductive layer is completely dissolved, rinsed with deionized water for 5 times, and then baked at 100° C. for 20 minutes, then its mass is weighed with the same balance, and recorded it as $m_2$, in g. Thicknesses at the 20 positions are measured by the same tenthousandth micrometer, and their average value is taken and recorded as $d_2$, in μm. The density of the conductive layer is calculated according to the following formula, in g/cm³.

$$\text{Density of conductive layer} = \frac{(m_1 - m_2)}{(d_1 - d_2)/1000}$$

Five positive electrode current collectors with the same size are respectively taken to test the density of the conductive layer, and an average value of the results is taken.

The volume resistivity of the conductive layer is set to ρ, then $\rho = R_S \times d$, where unit of ρ is Ω·m; $R_S$ is the square resistance of the conductive layer, in Ω, and d is the thickness of the conductive layer, in m. The square resistance $R_S$ of the conductive layer can be measured with reference to the four-probe-measuring method mentioned above, which will not be repeated here.

The bonding force F between the support layer and the conductive layer can be tested by a method known in this field. For example, a positive electrode current collector where the conductive layer is on one surface of the support layer is selected as a sample to be tested, with a width h of 0.02 m. At normal temperature and pressure (25° C., 0.1 MPa) a 3M double-sided adhesive is pasted uniformly onto a stainless steel plate, and then the sample to be tested is uniformly pasted to the double-sided adhesive. The conductive layer and the support layer of the sample to be tested are separated by a high-speed rail tensile machine. A maximum tension x (N) is read according to a data diagram of tension force and displacement, and the bonding force F (N/m) between the conductive layer and the support layer is calculated according to F=x/h.

Positive Electrode Piece

A second aspect of the embodiments of the present application provides a positive electrode piece, which includes a positive electrode current collector and a positive electrode active material layer which are laminated, where the positive electrode current collector is the positive electrode current collector 10 of the first aspect of the embodiments of the present application.

Due to the adoption of the positive electrode current collector 10 in the first aspect of the embodiments of the present application, the positive electrode piece of the embodiments of the present application has a high weight energy density, good nail piercing safety performance and electrochemical performance compared with a traditional positive electrode piece.

As an example, the positive electrode piece includes a support layer 101, a conductive layer 102 and a positive electrode active material layer which are laminated, where the support layer 101 includes a first surface 101a and a second surface 101b which are opposite to each other. The conductive layer 102 is disposed on the first surface 101a and/or the second surface 101b of the support layer 101, and the positive electrode active material layer is disposed on a surface of the conductive layer 102 facing away from the support layer 101.

In the positive electrode piece of the embodiments of the present application, the positive electrode active material layer can adopt a positive electrode active material known in the field, and can carry out reversible intercalation/deintercalation of ions.

For example, the positive electrode active material for a lithium ion secondary battery can be a lithium transition metal composite oxide, where the transition metal can be one or more of Mn, Fe, Ni, Co, Cr, Ti, Zn, V, Al, Zr, Ce and Mg. Lithium transition metal composite oxide can also be doped with a highly electronegative element, such as one or more of S, F, Cl and I, which could make the positive electrode active material have high structural stability and electrochemical performance. As examples, the lithium transition metal composite oxide can be such as one or more of $LiMn_2O_4$, $LiNiO_2$, $LiCoO_2$, $LiNi_{1-y}Co_yO_2$ (0<y<1), $LiNi_aCo_bAl_{1-a-b}O_2$ (0<a<1, 0<b<1, 0<a+b<1), $LiMn_{1-m-n}Ni_m$ $Co_nO_2$ ($0<m<1$, $0<n<1$, $0<m+n<1$), $LiMPO_4$ (M can be one or more of Fe, Mn and Co) and $Li_3V_2(PO_4)_3$.

Optionally, the positive electrode active material layer may also include a conductive agent. As an example, the conductive agent is one or more of graphite, superconducting carbon, acetylene black, carbon black, Ketjen black, carbon dot, carbon nanotube, graphene and carbon nanofiber.

Optionally, the positive electrode active material layer may also include a binder. As an example, the binder is one or more of styrene-butadiene rubber (SBR), water-based acrylic resin, carboxymethyl cellulose (CMC), polyvinylidene fluoride (PVDF), polytetrafluoroethylene (PTFE), ethylene-vinyl acetate copolymer (EVA), polyvinyl alcohol (PVA) and polyvinyl butyral (PVB).

The positive electrode piece can be prepared according to a conventional method in the field. Usually, a positive electrode active material, an optional conductive agent and a binder are dispersed in a solvent (such as N-methyl pyrrolidone, abbreviated as NMP) to form a uniform positive electrode slurry. The positive electrode slurry is coated on a positive electrode current collector, and then is dried and other processes, to obtain the positive electrode piece.

Electrochemical Device

A third aspect of the embodiments of the present application provides an electrochemical device, which includes a positive electrode piece, a negative electrode piece, a diaphragm and an electrolyte, where the positive electrode piece is the positive electrode piece of the second aspect of the embodiments of the present application.

The above electrochemical device can be a lithium ion secondary battery, a lithium primary battery, a sodium ion battery, a magnesium ion battery, etc., but not limited thereto.

Since the electrochemical device adopts the positive electrode piece provided according to the second aspect of the embodiments of the present application, the electrochemical device of the embodiments of the present application has a high weight energy density, good nail piercing safety performance and electrochemical performance.

The negative electrode piece may include a negative electrode current collector and a negative electrode active material layer.

The negative electrode current collector may be a metal foil or porous metal foil including one or more of copper, copper alloy, nickel, nickel alloy, iron, iron alloy, titanium, titanium alloy, silver and silver alloy.

The negative electrode active material layer can use a negative electrode active material known in the field, and can carry out reversible intercalation/deintercalation of ions.

For example, the negative electrode active material for the lithium ion secondary battery can be one or more of lithium metal, natural graphite, artificial graphite, Mesocarbon microbeads (MCMB for short), hard carbon, soft carbon, silicon, silicon-carbon composite, SiO, Li—Sn alloy, Li—Sn—O alloy, Sn, SnO, $SnO_2$, spinel structure lithium titanate and Li—Al alloy.

Optionally, the negative electrode active material layer may also include a binder. As an example, the binder is one or more of styrene-butadiene rubber (SBR), water-based acrylic resin, carboxymethyl cellulose (CMC), polyvinylidene fluoride (PVDF), polytetrafluoroethylene (PTFE), ethylene-vinyl acetate copolymer (EVA), polyvinyl alcohol (PVA) and polyvinyl butyral (PVB).

Optionally, the negative electrode active material layer may also include a conductive agent. As an example, the conductive agent is one or more of graphite, superconducting carbon, acetylene black, carbon black, Ketjen black, carbon dot, carbon nanotube, graphene and carbon nanofiber.

The negative electrode piece can be prepared according to a conventional method in the field. Usually, a negative electrode active material, an optional conductive agent and a binder are dispersed in a solvent to form a uniform negative electrode slurry, where the solvent can be NMP or deionized water. The negative electrode slurry is coated on a negative electrode current collector, and then is dried and other processes, to obtain the negative electrode piece.

There is no particular restriction on the above-mentioned diaphragm, and any well-known porous structure diaphragm with electrochemical stability and chemical stability can be selected, for example, it can be a single-layer or multi-layer film of one or more of glass fiber, non-woven fabric, polyethylene, polypropylene and polyvinylidene fluoride.

The electrolyte includes an organic solvent and an electrolyte salt. As a medium for transporting ions in an electrochemical reaction, the organic solvent may use an organic solvent known in the field for an electrolyte of an electrochemical device can be used. As a source of ions, the electrolyte salt can be an electrolyte salt known in the field for an electrolyte of an electrochemical device.

For example, the organic solvent for a lithium ion secondary battery can be one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS) and diethyl sulfone (ESE).

For example, the electrolyte salt for a lithium ion secondary battery can be one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (difluorosulfonyl lithium imide), LiTFSI (lithium bistrifluoromethanesulfonimide), LiTFS (lithium trifluoromethanesulfonate), LiDFOB (lithium difluorooxalate borate), LiBOB (lithium bisoxalate borate), $LiPO_2F_2$ (lithium difluorophosphate), LiDFOP (lithium difluorodioxalate phosphate) and LiTFOP (lithium tetrafluorooxalate phosphate).

The positive electrode piece, the diaphragm and the negative electrode piece are laminated in sequence, so that the diaphragm is located between the positive electrode piece and the negative electrode piece to play a role of isolation, to obtain an electrode assembly, or to obtain an electrode assembly after winding; the electrode assembly is placed in a packaging shell, and an electrolyte is injected and sealing is conducted, to prepare the electrochemical device.

In some embodiments, the electrochemical device may include an outer package for packaging the positive electrode piece, the negative electrode piece and the electrolyte. As an example, the positive electrode piece, the negative electrode piece and the diaphragm can be laminated or wound to form a laminated structure electrode assembly or a wound structure electrode assembly, and the electrode assembly is packaged in the outer package; the electrolyte can be an electrolyte solution, and the electrolyte solution is infiltrated in the electrode assembly. The number of the electrode assembly in the electrochemical device can be one or several, which can be adjusted according to requirements.

In some embodiments, the outer package of the electrochemical device may be a soft bag, such as a bag-type soft bag. The material of the soft bag may be plastic, such as one or more of polypropylene PP, polybutylene terephthalate PBT, polybutylene succinate PBS, etc. The outer package of the electrochemical device can also be a hard shell, such as an aluminum shell.

Figure 10:
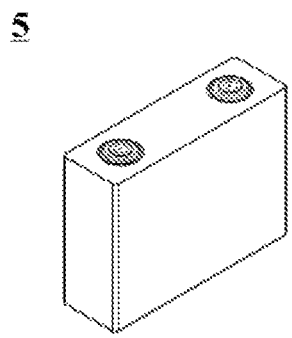
FIG. 10 shows a schematic diagram of an embodiment of an electrochemical device of the present application.

In the present application, there is no particular restriction on the shape of the electrochemical device, the shape can be cylindrical, square or any other shape. FIG. 10 shows an electrochemical device 5 with a square structure as an example.

In some embodiments, the electrochemical device can be assembled into a battery module, and the number of the electrochemical device contained in the battery module can be multiple, and the specific number can be adjusted according to the application and capacity of the battery module.

Figure 11:
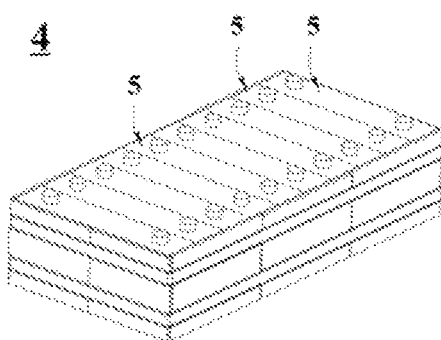
FIG. 11 shows a schematic diagram of an embodiment of a battery module of the present application.

FIG. 11 shows a battery module 4 as an example. Referring to FIG. 11, in the battery module 4, a plurality of electrochemical devices 5 may be arranged sequentially along the length direction of the battery module 4. Of course, it can also be arranged in any other way. Further, the plurality of electrochemical devices 5 can be fixed by a fastener.

Optionally, the battery module 4 may also include a shell having an accommodation space, and the plurality of electrochemical devices 5 are accommodated in the accommodation space.

In some embodiments, the above battery module can also be assembled into a battery pack, and the number of the battery module contained in the battery pack can be adjusted according to the application and capacity of the battery pack.

Figure 12:
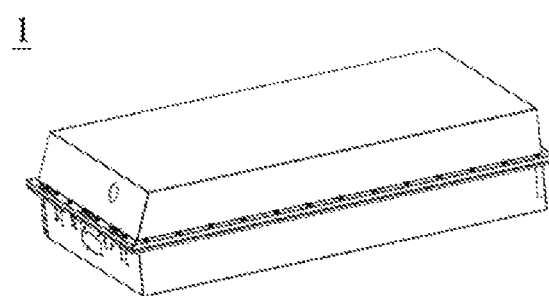
FIG. 12 shows a schematic diagram of an embodiment of a battery pack of the present application.
Figure 13:
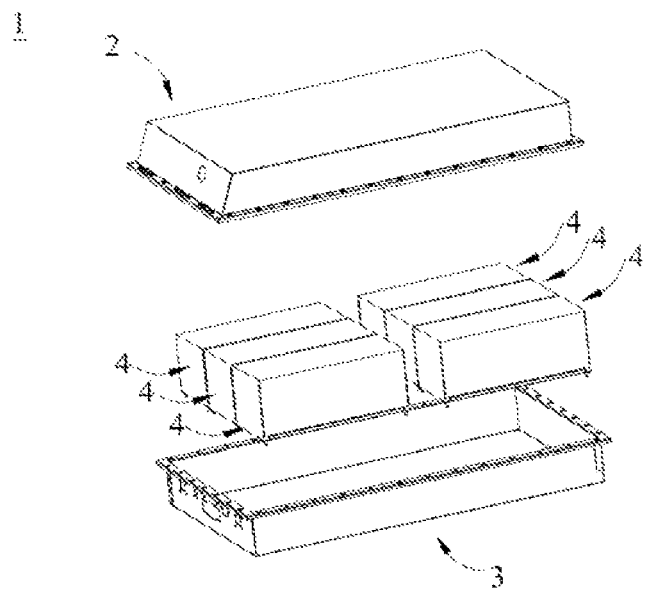
FIG. 13 is an exploded view of FIG. 12.

FIGS. 12 and 13 show a battery pack 1 as an example. Referring to FIGS. 12 and 13, the battery pack 1 may include a battery box and a plurality of battery modules 4 arranged in the battery box. The battery box includes an upper box body 2 and a lower box body 3, and the upper box body 2 can cover the lower box body 3 and form a closed space for accommodating the battery modules 4. The plurality of battery modules 4 can be arranged in the battery box in any way.

Apparatus

A fourth aspect of the embodiments of the present application provides an apparatus including the electrochemical device of the third aspect of the embodiments of the present application. The electrochemical device can be used as a power source of the apparatus or as an energy storage unit of the apparatus. The apparatus may include, but are not limited to, a mobile apparatus (such as mobile phone, notebook computer, etc.), electric vehicle (such as pure electric vehicle, hybrid electric vehicle, plug-in hybrid electric vehicle, electric bicycle, electric scooter, electric golf cart, electric truck, etc.), electric train, ship and satellite, and energy storage system, etc.

The apparatus can select an electrochemical device, a battery module or a battery pack according to its use requirements.

Figure 14:
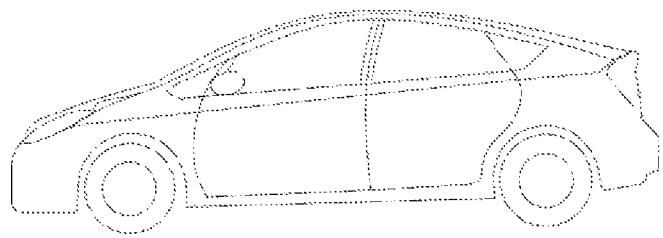
FIG. 14 shows a schematic diagram of an embodiment of an electrochemical device of the present application as a power source device.

FIG. 14 shows an apparatus as an example. The apparatus can be a pure electric vehicle, a hybrid electric vehicle, or a plug-in hybrid electric vehicle, etc. In order to meet the requirements of the apparatus for high power and high energy density of the electrochemical device, the battery pack or the battery module can be used.

As another example, the apparatus can be a mobile phone, a tablet computer, a notebook computer, and so on. The apparatus is generally required to be thin and light, and can use the electrochemical device as a power source.

EXAMPLES

The following examples more specifically describe the content disclosed in the present application, and these examples are only used for explanatory description, because it is obvious for those skilled in the field to make various modifications and changes within the scope of the disclosure of the present application. Unless otherwise stated, all parts, percentages, and ratios reported in the following examples are based on weight, and all reagents used in the examples are commercially available or synthesized according to a conventional method, and can be used directly without further treatment, and the instruments used in the examples are commercially available.

Preparation Method

Preparation of Positive Electrode Current Collector

A support layer with a predetermined thickness is selected and is subjected to a surface cleaning treatment, and the support layer after the surface cleaning treatment is placed in a vacuum plating chamber, and a high purity aluminum wire in a metal evaporation chamber is melted and evaporated at a high temperature of 1,300° C.-2,000° C. The evaporated aluminum passes through a cooling system in the vacuum plating chamber, and finally is deposited on two surfaces of the support layer to form a conductive layer.

The positive electrode current collector may have different $T_1$ and $T_2$ values by adjusting the material, thickness, density, preparation conditions (such as vacuum, atmosphere, humidity, temperature, etc.) of the conductive layer, and adjusting the material and thickness of the support layer.

Preparation of Positive Electrode Piece

A positive electrode active material $LiNi_{1/3}Co_{1/3}Mn_{1/3}O_2$ (NCM333), conductive carbon black and binder polyvinylidene fluoride ((PVDF)) were fully stirred and mixed in an appropriate amount of N-methylpyrrolidone (NMP) solvent at a weight ratio of 93:2:5 to form a uniform positive electrode slurry; the positive electrode slurry was coated on the positive electrode current collector, and the positive electrode piece was obtained after drying and other processes.

Conventional Positive Electrode Current Collector

An aluminum foil with a thickness of 12 μm.

Conventional Positive Electrode Piece

Different from the positive electrode piece of the example of the present application, a conventional positive electrode current collector is adopted.

Negative Electrode Current Collector

A copper foil with a thickness of 8 μm.

Preparation of Negative Electrode Piece

A negative electrode active material graphite, conductive carbon black, thickener sodium carboxymethyl cellulose (CMC) and binder styrene butadiene rubber emulsion (SBR) were fully stirred and mixed in an appropriate amount of deionized water at a weight ratio of 96.5:1.0:1.0:1.5 to form a uniform negative electrode slurry; the negative electrode slurry was coated on the negative electrode current collector, and the negative electrode piece was obtained after drying and other processes.

Preparation of Electrolyte

Ethylene carbonate (EC) and ethyl methyl carbonate (EMC) with a volume ratio of 3:7 were mixed uniformly to obtain an organic solvent, and then 1 mol/L of $LiPF_6$ was uniformly dissolved in the organic solvent.

Preparation of Lithium Ion Secondary Battery

The positive electrode piece, the diaphragm (PP/PE/PP composite film) and the negative electrode piece are laminated in sequence, and then wound into an electrode assembly and packaged in a packaging shell. The above electrolyte is injected into the electrode assembly, and the lithium ion secondary battery is obtained by sealing, standing, hot and cold pressing, chemical conversion and other processes.

Test Part

1. The positive electrode current collector was tested according to the test method described above.

2. Performance test of battery (1) Cycle Performance Test

At 45° C., the lithium ion secondary battery is charged to 4.2V at a constant current rate of 1 C, then charged at a constant voltage until the current is less than or equal to 0.05 C, and then discharged to 2.8V at a constant current rate of 1 C. This is a charge-discharge cycle, and the discharge capacity for this time is the discharge capacity at the first cycle. The battery was subjected to 1,000 charge-discharge cycles according to the above method, and the discharge capacity at 1,000th cycle was recorded.

Capacity retention rate (%) of the lithium ion secondary battery after 1,000 cycles at 45° C. and 1 C/1 C=Discharge capacity at 1,000th cycle/Discharge capacity at first cycle× 100%

(2) Nail Piercing Test

At 25° C., the lithium ion secondary battery was charged to 4.2V at a constant current rate of 1 C, and then charged at a constant voltage until the current was less than or equal to 0.05 C. Then, a steel needle with a diameter of 8 mm pierced the whole lithium ion secondary battery at a speed of 25 mm/s, and the steel needle was retained in the lithium ion secondary battery to monitor changes in temperature and voltage of the lithium ion secondary battery.

Test of battery temperature: using a multi-channel thermometer, a temperature sensing line was attached to geometric centers of a needle-puncture surface and the back of the battery to be nail-pierced, and after nail-piercing was completed, a battery temperature tracking test was performed for five minutes, and then the battery temperature at five minutes was recorded to get a temperature rise of the battery.

Test of battery voltage: the positive and negative electrodes of the battery to be nail-pierced were connected to a measuring end of an internal resistance meter, after the nail-piercing is finished, a battery voltage tracking test was performed for five minutes, and then the battery voltage at five minutes was recorded.

Test Result

1. Effects of Thickness $D_1$ of Conductive Layer, and Elongation at Break B and Volume Resistivity of Support Layer

TABLE 1

| | Conductive layer | | | Support layer | | | | | |
|---|---|---|---|---|---|---|---|---|---|
| Number | Material | $D_1$ μm | Density g/cm³ | Material | $D_2$ μm | B % | Volume resistivity Ω·m | E GPa | $T_1$ % |
| Positive electrode current collector 1 | Al | 2.0 | 2.6 | PET | 10 | 40 | $2.1 \times 10^{14}$ | 4.2 | 0 |
| Positive electrode current collector 2 | Al | 1.5 | 2.6 | PET | 10 | 40 | $2.1 \times 10^{14}$ | 4.2 | 1 |
| Positive electrode current collector 3 | Al | 1.0 | 2.6 | PET | 10 | 60 | $2.1 \times 10^{14}$ | 4.2 | 3 |
| Positive electrode current collector 4 | Al | 0.9 | 2.6 | PET | 10 | 75 | $2.1 \times 10^{14}$ | 4.2 | 5 |
| Positive electrode current collector 5 | Al | 0.9 | 2.6 | PPS | 10 | 15 | $2.1 \times 10^{14}$ | 4.0 | 3 |
| Positive electrode current collector 6 | Al | 0.9 | 2.6 | PEN | 10 | 30 | $2.1 \times 10^{14}$ | 5.1 | 7 |
| Positive electrode current collector 7 | Al | 0.9 | 2.6 | PI | 10 | 12 | $2.1 \times 10^{14}$ | 1.9 | 9 |
| Positive electrode current collector 8 | Al | 0.9 | 2.6 | PP | 10 | 400 | $2.1 \times 10^{14}$ | 2.2 | 0 |
| Positive electrode current collector 9 | Al | 0.6 | 2.6 | PEN | 10 | 40 | $2.1 \times 10^{14}$ | 5.1 | 0 |
| Positive electrode current collector 10 | Al | 0.5 | 2.6 | PEN | 10 | 100 | $2.1 \times 10^{14}$ | 5.1 | 0 |
| Positive electrode current collector 11 | Al | 0.3 | 2.6 | PEN | 10 | 200 | $2.1 \times 10^{14}$ | 5.1 | 0 |
| Conventional positive electrode current collector | Al | 12 | / | / | / | / | / | / | / |
| Comparative current collector 1 | Al | 0.9 | 2.4 | Cellophane | 10 | 7 | $2.1 \times 10^{14}$ | 9.1 | 55 |

TABLE 2

| | | Nail piercing test | |
|---|---|---|---|
| Number of battery | Number of positive electrode current collector | Temperature rise of battery (° C.) | Battery voltage (V) |
| Battery 1 | Positive electrode current collector 1 | 31 | 3.71 |
| Battery 2 | Positive electrode current collector 2 | 25 | 3.90 |
| Battery 3 | Positive electrode current collector 3 | 21 | 3.85 |
| Battery 4 | Positive electrode current collector 4 | 3 | 4.02 |
| Battery 5 | Positive electrode current collector 5 | 7 | 3.85 |
| Battery 6 | Positive electrode current collector 6 | 5 | 3.98 |

TABLE 2-continued

| Number of battery | Number of positive electrode current collector | Nail piercing test Temperature rise of battery (° C.) | Battery voltage (V) |
|---|---|---|---|
| Battery 7 | Positive electrode current collector 7 | 13 | 3.6 |
| Battery 8 | Positive electrode current collector 8 | 2 | 4.11 |
| Battery 9 | Positive electrode current collector 9 | 9 | 4.09 |
| Battery 10 | Positive electrode current collector 10 | 3 | 4.15 |
| Battery 11 | Positive electrode current collector 11 | 2 | 4.21 |

TABLE 2-continued

| Number of battery | Number of positive electrode current collector | Nail piercing test Temperature rise of battery (° C.) | Battery voltage (V) |
|---|---|---|---|
| Conventional battery 1 | Conventional positive electrode current collector | >500 | 0 |
| Comparative battery 1 | Comparative current collector 1 | >500 | 0 |

The positive electrode current collector of the examples of the present application could greatly improve the nail-piercing safety performance of the battery. As can be seen from the data in Table 2, for the battery where a conventional positive electrode current collector is used, or the battery where the elongation at break of the support layer of the positive electrode current collector was less than 12%, at the moment of nail piercing, the temperature of the battery rises sharply by 500° C. and the voltage drops sharply to zero. This showed that at the moment of nail piercing, the battery had an internal short circuit, generating a large amount of heat, and the battery was instantly thermally out of control and destroyed, resulting in failure. In the examples of the present application, the positive electrode current collector, the thickness D1 of the conductive layer, the elongation at break B and the volume resistivity of the support layer were all within a specific range, and in the nail piercing test, the temperature rise of the battery can be controlled 35° C. or less, further 25° C. or less, more further 10° C. or less, and the voltage of the battery is basically stable, and the battery can work normally.

It can be seen that in the case of internal short circuit of the battery, the positive electrode current collector of the embodiments of the present application could greatly reduce short-circuit heat generation, thus improving the safety performance of the battery; in addition, the influence of short circuit damage on the battery can be limited to a range of "point", only forming a "point open circuit", without affecting the normal operation of the battery for a period of time.

2. Influence of $T_1$ Value of Positive Electrode Current Collector on Electrochemical Device

TABLE 3

| Number | Conductive layer Material | $D_1$ μm | Density g/cm³ | Support layer Material | $D_2$ μm | B % | Volume resistivity Ω·m | E GPa | $T_1$ % |
|---|---|---|---|---|---|---|---|---|---|
| Positive electrode current collector 3 | Al | 1.0 | 2.6 | PET | 10 | 60 | $2.1 \times 10^{14}$ | 4.2 | 3 |
| Positive electrode current collector 31 | Al | 1.0 | 2.5 | PET | 10 | 60 | $2.1 \times 10^{14}$ | 4.2 | 10 |
| Positive electrode current collector 32 | Al | 1.0 | 2.6 | PET | 10 | 60 | $2.1 \times 10^{14}$ | 4.2 | 5 |
| Positive electrode current collector 33 | Al | 1.0 | 2.6 | PET | 10 | 60 | $2.1 \times 10^{14}$ | 4.2 | 2 |
| Positive electrode current collector 34 | Al | 1.0 | 2.6 | PET | 10 | 60 | $2.1 \times 10^{14}$ | 4.2 | 1 |
| Positive electrode current collector 35 | Al | 1.0 | 2.7 | PET | 10 | 60 | $2.1 \times 10^{14}$ | 4.2 | 0 |
| Positive electrode current collector 36 | Aluminum Alloy | 1.0 | 2.8 | PET | 10 | 60 | $2.1 \times 10^{14}$ | 4.2 | 1 |
| Comparative current collector 2 | Al | 1.0 | 2.0 | PET | 10 | 60 | $2.1 \times 10^{14}$ | 4.2 | 154 |
| Comparative current collector 3 | Aluminum Alloy | 1.0 | 2.3 | PET | 10 | 60 | $2.1 \times 10^{14}$ | 4.2 | 210 |

In Table 3, the aluminum alloy is aluminum alloy 7049 (aluminum-zinc alloy, Finkl Company, American)

The positive electrode current collectors in Table 3 were subjected to an overcurrent test, the positive electrode current collectors were cut into a width of 100 mm, coated with a positive electrode active material layer of 80 mm width at the center of the width direction and rolled to prepare positive electrode pieces. The rolled electrode pieces were cut into long strips of 100 mm×30 mm along the width direction, and 10 strips for each electrode piece were cut out. During the test, uncoated conductive areas on both sides of samples of the electrode pieces were respectively connected to positive and negative terminals of a charging and discharging machine, and then the charging and discharging machine was set so that 1 A current passed through the electrode pieces. If the electrode pieces was kept for 10 seconds without fuse, it will be deemed as passing the test, otherwise it will be deemed as failure. 10 electrode pieces were tested in each group of the samples, and the results of the overcurrent test were shown in Table 4 below.

TABLE 4

| Number of positive electrode piece | Number of positive electrode current collector | Pass rate of overcurrent test (%) |
|---|---|---|
| Positive electrode piece 3 | Positive electrode current collector 3 | 80 |

TABLE 4-continued

| Number of positive electrode piece | Number of positive electrode current collector | Pass rate of overcurrent test (%) |
|---|---|---|
| Positive electrode piece 31 | Positive electrode current collector 31 | 60 |
| Positive electrode piece 32 | Positive electrode current collector 32 | 70 |
| Positive electrode piece 33 | Positive electrode current collector 33 | 100 |
| Positive electrode piece 34 | Positive electrode current collector 34 | 100 |
| Positive electrode piece 35 | Positive electrode current collector 35 | 100 |
| Positive electrode piece 36 | Positive electrode current collector 36 | 100 |
| Comparative electrode piece 2 | Comparative current collector 2 | 0 |
| Comparative electrode piece 3 | Comparative current collector 3 | 0 |

When the tensile strain of the positive electrode current collector was 2%, the square resistance growth rate of the conductive layer was not more than 10%. At this time, the positive electrode piece using the positive electrode current collector can have good conductivity after rolling. Otherwise, the conductivity was poor and had little practical value in battery products. Preferably, $T_1 \leq 5\%$, preferably, $T_1 \leq 2\%$, and more preferably, $T_1 \leq 1\%$.

3. Effect of $T_2$ Value of Positive Electrode Current Collector on Nail Piercing Safety Performance of Electrochemical Device.

TABLE 5

| | Conductive layer | | | Support layer | | | | | |
|---|---|---|---|---|---|---|---|---|---|
| Number | Material | $D_1$ μm | Density g/cm³ | Material | $D_2$ μm | B % | Volume resistivity Ω·m | E GPa | $T_2$ % |
| Positive electrode current collector 3 | Al | 1.0 | 2.6 | PET | 10 | 60 | $2.1 \times 10^{14}$ | 4.2 | 90 |
| Positive electrode current collector 51 | Al | 1.0 | 2.5 | PET | 10 | 60 | $2.1 \times 10^{14}$ | 4.2 | 50 |
| Positive electrode current collector 52 | Al | 1.0 | 2.6 | PET | 10 | 60 | $2.1 \times 10^{14}$ | 4.2 | 100 |
| Positive electrode current collector 53 | Al | 1.0 | 2.6 | PET | 10 | 60 | $2.1 \times 10^{14}$ | 4.2 | 150 |
| Positive electrode current collector 54 | Al | 1.0 | 2.6 | PET | 10 | 60 | $2.1 \times 10^{14}$ | 4.2 | 200 |
| Positive electrode current collector 55 | Al | 1.0 | 2.6 | PET | 10 | 60 | $2.1 \times 10^{14}$ | 4.2 | 120 |
| Positive electrode current collector 56 | Aluminum Alloy | 1.0 | 2.6 | PET | 10 | 60 | $2.1 \times 10^{14}$ | 4.2 | 400 |
| Comparative current collector 4 | Al | 1.0 | 2.7 | PET | 10 | 60 | $2.1 \times 10^{14}$ | 4.2 | 27 |

TABLE 6

| | | Nail Piercing | |
|---|---|---|---|
| Number of battery | Number of positive electrode current collector | Temperature rise of battery (° C.) | Voltage of battery (V) |
| Battery 3 | Positive electrode current collector 3 | 21 | 3.85 |
| Battery 51 | Positive electrode current collector 51 | 27 | 3.41 |
| Battery 52 | Positive electrode current collector 52 | 17 | 3.95 |
| Battery 53 | Positive electrode current collector 53 | 9 | 3.81 |
| Battery 54 | Positive electrode current collector 54 | 7 | 4.11 |
| Battery 55 | Positive electrode current collector 55 | 15 | 3.98 |
| Battery 56 | Positive electrode current collector 56 | 5 | 4.19 |
| Comparative battery 4 | Comparative current collector 4 | >500 | 0 |

It can be seen from the data in Table 6 that when the tensile strain of the positive electrode current collector was greater than or equal to 4% and the square resistance growth rate $T_2$ of the conductive layer was less than 50%, the nail piercing safety performance of the battery was poor. For example, for the comparative battery 4, at the moment of nail piercing, the temperature of the battery rose sharply by 500° C. and the voltage dropped to zero. This showed that at the moment of nail piercing, the battery had an internal short circuit, generating a large amount of heat, and the battery was instantly thermally out of control and destroyed, resulting in failure. When the tensile strain of the positive electrode current collector was greater than or equal to 4% and the square resistance growth rate $T_2$ of the conductive layer was 50% or more, the nail piercing safety performance of the battery was good. In the nail piercing test, the temperature rise of the battery can basically be controlled 30° C. or less, further 20° C. or less, more further 10° C. or less, and the battery voltage was basically stable, and the battery can work normally.

It can be seen that when the tensile strain of the positive electrode current collector was greater than or equal to 4%, the square resistance growth rate $T_2$ of the conductive layer was 50% or more, especially 100% or more, and more especially 150% or more. In the case of internal short circuit of the battery, the short-circuit heat generation could be greatly reduced and the safety performance of the battery could be improved; in addition, the influence of short circuit damage on the battery could be limited to a range of "point", only forming a "point open circuit", without affecting the normal operation of the battery for a period of time.

4. Influence of Protective Layer

TABLE 7

| Number | Lower protective layer Material | $D_b$ (nm) | Upper protective layer Material | $D_a$ (nm) |
|---|---|---|---|---|
| Positive electrode current collector 3 | / | / | / | / |
| Positive electrode current collector 3-1 | / | / | Nickel | 1 |
| Positive electrode current collector 3-2 | / | / | Nickel oxide | 10 |
| Positive electrode current collector 3-3 | / | / | Alumina | 50 |
| Positive electrode current collector 3-4 | / | / | Nickel oxide | 100 |
| Positive electrode current collector 3-5 | Nickel | 5 | / | / |
| Positive electrode current collector 3-6 | Alumina | 20 | / | / |
| Positive electrode current collector 3-7 | Alumina | 80 | / | / |
| Positive electrode current collector 3-8 | Nickel oxide | 100 | / | / |
| Positive electrode current collector 3-9 | Nickel | 5 | Nickel | 10 |
| Positive electrode current collector 3-10 | Nickel oxide | 8 | Nickel oxide | 10 |
| Positive electrode current collector 3-11 | Alumina | 20 | Nickel oxide | 50 |
| Positive electrode current collector 3-12 | Nickel oxide | 30 | Alumina | 50 |
| Positive electrode current collector 3-13 | Alumina | 50 | Alumina | 100 |

In Table 7, the positive electrode current collectors 3-1 to 3-13 were all provided with protective layers based on the positive electrode current collector 3.

TABLE 8

| Number of battery | Number of positive electrode current collector | Capacity retention rate after 1000 cycles at 45° C. and 1C/1C (%) |
|---|---|---|
| Conventional battery 1 | Conventional positive electrode current collector | 86.5 |
| Battery 3 | Positive electrode current collector 3 | 77.3 |
| Battery 3-1 | Positive electrode current collector 3-1 | 78.1 |
| Battery 3-2 | Positive electrode current collector 3-2 | 79.4 |
| Battery 3-3 | Positive electrode current collector 3-3 | 79.9 |
| Battery 3-4 | Positive electrode current collector 3-4 | 78.9 |
| Battery 3-5 | Positive electrode current collector 3-5 | 78.2 |
| Battery 3-6 | Positive electrode current collector 3-6 | 79.5 |
| Battery 3-7 | Positive electrode current collector 3-7 | 80.6 |
| Battery 3-8 | Positive electrode current collector 3-8 | 79.8 |
| Battery 3-9 | Positive electrode current collector 3-9 | 81.8 |
| Battery 3-10 | Positive electrode current collector 3-10 | 83.9 |
| Battery 3-11 | Positive electrode current collector 3-11 | 87.1 |
| Battery 3-12 | Positive electrode current collector 3-12 | 87.6 |
| Battery 3-13 | Positive electrode current collector 3-13 | 87.3 |

The battery using the positive electrode current collector of the examples of the present application had good cycle life, especially the battery made of the positive electrode current collector provided with a protective layer, the capacity retention rate was further improved after 1,000 cycles at 45° C. and 1 C/1 C, indicating that the reliability of the battery was better.

5. Effect of Positive Electrode Current Collector of the Present Application in Improving Weight Energy Density of Electrochemical Device.

TABLE 9

| Number | Support layer Material | $d_2$ μm | Conductive layer Material | $D_1$ μm | Thickness of positive electrode current collector μm | Weight percentage of positive current collector % |
|---|---|---|---|---|---|---|
| Positive electrode current collector 91 | PET | 10 | Al | 0.5 | 11 | 50 |
| Positive electrode current collector 92 | PI | 6 | Al | 0.3 | 6.6 | 30 |
| Positive electrode current collector 93 | PI | 5 | Al | 1.5 | 8.0 | 45.8 |
| Positive electrode current collector 94 | PET | 4 | Al | 0.9 | 5.8 | 31.7 |
| Positive electrode current collector 95 | PI | 3 | Al | 0.2 | 3.4 | 16.7 |

TABLE 9-continued

| Number | Support layer Material | $d_2$ μm | Conductive layer Material | $D_1$ μm | Thickness of positive electrode current collector μm | Weight percentage of positive current collector % |
|---|---|---|---|---|---|---|
| Positive electrode current collector 96 | PI | 1 | Al | 0.4 | 1.8 | 10.8 |
| Conventional positive electrode current collector | / | / | Al | / | 12 | 100 |

In Table 9, the weight percentage of the positive electrode current collector refers to the percentage of the weight of the positive electrode current collector per unit area divided by the weight of the conventional positive electrode current collector per unit area.

Compared with the traditional aluminum foil positive electrode current collector, the weight of the positive electrode current collector of the present application was reduced to varying degrees, thus the weight energy density of the battery could be increased.

The above are only specific embodiments of the present application, but the protection scope of the present application is not limited to this. Any technical person familiar with this technical field can easily think of various equivalent modifications or replacements within the technical scope disclosed in the present application, and these modifications or replacements shall be covered by the protection scope of the present application. Therefore, the protection scope of the present application shall be subject to the protection scope of the claims.

What is claimed is:

1. A positive electrode current collector, comprising:
a support layer, having two opposite surfaces in a direction of its own thickness;
a conductive layer, provided on at least one of the two surfaces of the support layer;
wherein
a material of the conductive layer is aluminum or aluminum alloy, and a thickness $D_1$ of the conductive layer is 600 nm≤$D_1$≤1.5 μm;
an elongation at break B of the support layer is 400%≥B≥30%;
a volume resistivity of the support layer is greater than or equal to $1.0\times10^{-5}$ Ω·m;
when a tensile strain of the positive electrode current collector is 2%, a square resistance growth rate $T_1$ of the conductive layer is $T_1$≤1%;
wherein the positive electrode current collector further comprises a protective layer, the protective layer is provided on at least one of two opposite surfaces in a thickness direction of the conductive layer itself;
the protective layer comprises one or more of nickel, chromium, nickel-based alloy, copper-based alloy, alumina, cobalt oxide, chromium oxide, nickel oxide, graphite, superconducting carbon, acetylene black, carbon black, Ketjen black, carbon dot, carbon nanotube, graphene and carbon nanofiber.

2. A positive electrode current collector, comprising:
a support layer, having two opposite surfaces in a direction of its own thickness;
a conductive layer, provided on at least one of the two surfaces of the support layer;
wherein
a material of the conductive layer is aluminum or aluminum alloy, and a thickness $D_1$ of the conductive layer is 600 nm≤$D_1$≤1.5 μm;
an elongation at break B of the support layer is 400%≥B≥30%;
a volume resistivity of the support layer is greater than or equal to $1.0\times10^{-5}$ Ω·m;
when a tensile strain of the positive electrode current collector is greater than or equal to 4%, a square resistance growth rate $T_2$ of the conductive layer is $T_2$≥150%;
wherein the positive electrode current collector further comprises a protective layer, the protective layer is provided on at least one of two opposite surfaces in a thickness direction of the conductive layer itself;
the protective layer comprises one or more of nickel, chromium, nickel-based alloy, copper-based alloy, alumina, cobalt oxide, chromium oxide, nickel oxide, graphite, superconducting carbon, acetylene black, carbon black, Ketjen black, carbon dot, carbon nanotube, graphene and carbon nanofiber.

3. The positive electrode current collector according to claim 1, wherein a density of the conductive layer is 2.5 g/cm³-2.8 g/cm³.

4. The positive electrode current collector according to claim 1, wherein the support layer comprises one or more of a polymer material and a polymer-based composite material;
the polymer material is one or more of polyamide, polyimide, polyethylene terephthalate, polybutylene terephthalate, polyethylene naphthalate, polycarbonate, polyethylene, polypropylene, polypropylene-ethylene, acrylonitrile-butadiene-styrene copolymer, polyvinyl alcohol, polystyrene, polyvinyl chloride, polyvinylidene fluoride, polytetrafluoroethylene, polystyrene sodium sulfonate, polyacetylene, silicone rubber, polyoxymethylene, polyphenylene ether, polyphenylene sulfide, polyethylene glycol, polysulfur nitride polymer material, polyphenylene, polypyrrole, polyaniline, polythiophene, polypyridine, cellulose, starch, protein, epoxy resin, phenolic resin, their derivatives, their cross-linked products and their copolymers;
the polymer-based composite material comprises one or more of the polymer material and an additive, and the additive comprises one or more of a metal material and an inorganic non-metal material.

5. The positive electrode current collector according to claim 1, wherein,
a thickness $D_2$ of the support layer is 2 μm≤$D_2$≤6 μm; and,
a Young's modulus E of the support layer is 4 GPa≤E≤20 GPa.

6. The positive electrode current collector according to claim 1, wherein the conductive layer is a vapor deposition layer or an electroplating layer.

7. The positive electrode current collector according to claim 1, wherein a thickness $D_3$ of the protective layer is 1 nm≤$D_3$≤200 nm and $D_3$≤$0.1D_1$.

8. The positive electrode current collector according to claim 7, wherein the protective layer comprises an upper protective layer provided on a surface of the conductive layer facing away from the support layer and a lower protective layer provided on a surface of the conductive layer facing the support layer;

a thickness $D_a$ of the upper protective layer is 1 nm≤$D_a$≤200 nm and $D_a$≤$0.1D_1$, a thickness $D_b$ of the lower protective layer is 1 nm≤$D_b$≤200 nm and $D_b$≤$0.1D_1$, and $D_a$ and $D_b$ therebetween satisfies 0.5 $D_a$≤$D_b$≤0.8 $D_a$;

both the upper protective layer and the lower protective layer each comprise a metal oxide.

9. A positive electrode piece, comprising a positive electrode current collector and a positive electrode active material layer provided on the positive electrode current collector, wherein the positive electrode current collector is the positive electrode current collector according to claim 1.

10. An electrochemical device, comprising a positive electrode piece, a negative electrode piece, a diaphragm and an electrolyte, wherein the positive electrode piece is the positive electrode piece according to claim 9.

11. An apparatus, comprising the electrochemical device according to claim 10.

12. A positive electrode current collector, comprising:
a support layer, having two opposite surfaces in a direction of its own thickness;
a conductive layer, provided on at least one of the two surfaces of the support layer;
wherein a material of the conductive layer is aluminum or aluminum alloy, and a thickness $D_1$ of the conductive layer is 300 nm≤$D_1$≤2 µm;
an elongation at break B of the support layer is 400%≥B≥30%;
a volume resistivity of the support layer is greater than or equal to $1.0×10^{-5}$ Ω·m;
when a tensile strain of the positive electrode current collector is 2%, a square resistance growth rate $T_1$ of the conductive layer is $T_1$≤1%;
wherein the positive electrode current collector further comprises a protective layer, the protective layer is provided on at least one of two opposite surfaces in a thickness direction of the conductive layer itself;
the protective layer comprises one or more of nickel, chromium, nickel-based alloy, copper-based alloy, alumina, cobalt oxide, chromium oxide, nickel oxide, graphite, superconducting carbon, acetylene black, carbon black, ketjen black, carbon dot, carbon nanotube, graphene and carbon nanofiber.

13. The positive electrode current collector according to claim 1, wherein,
a thickness $D_2$ of the support layer is 2 µm≤$D_2$≤6 µm; or,
a Young's modulus E of the support layer is 4 GPa≤E≤20 GPa.

14. The positive electrode current collector according to claim 1, wherein,
a thickness $D_2$ of the support layer is 1 µm≤$D_2$≤20 µm; and,
a Young's modulus E of the support layer is E≥1.9 GPa.

15. The positive electrode current collector according to claim 1, wherein,
a thickness $D_2$ of the support layer is 1 µm≤$D_2$≤20 µm; or,
a Young's modulus E of the support layer is E≥1.9 GPa.

* * * * *